United States Patent [19]

de Lange

[11] 4,313,627
[45] Feb. 2, 1982

[54] PIPE PART WITH A DISPLACEABLE ABUTMENT EDGE

[75] Inventor: Tinus de Lange, Vroomshoop, Netherlands

[73] Assignee: Wavin B.V., Zwolle, Netherlands

[21] Appl. No.: 25,198

[22] Filed: Mar. 29, 1979

[30] Foreign Application Priority Data

Mar. 30, 1978 [NL] Netherlands .......................... 7803400

[51] Int. Cl.³ .............................................. F16L 13/04
[52] U.S. Cl. .................................. 285/114; 285/302; 285/345; 285/374; 285/423
[58] Field of Search ............... 285/298, 345, 301, 114, 285/374, 230, 231, 224, 187, 54, 302, 423

[56] References Cited

U.S. PATENT DOCUMENTS

| | | | |
|---|---|---|---|
| 1,938,286 | 12/1933 | Elliott et al. | 285/374 X |
| 2,116,705 | 5/1938 | Marx et al. | 285/374 X |
| 2,269,560 | 1/1942 | Stout | 285/374 X |
| 3,858,914 | 1/1975 | Karie | 285/238 |

FOREIGN PATENT DOCUMENTS

| | | | |
|---|---|---|---|
| 1206680 | 12/1965 | Fed. Rep. of Germany | 285/374 |
| 1215452 | 4/1966 | Fed. Rep. of Germany | 285/374 |
| 2167439 | 8/1973 | France | 285/302 |
| 7605576 | 11/1977 | Netherlands | 285/156 |
| 971721 | 10/1964 | United Kingdom | 285/374 |

Primary Examiner—Dave W. Arola
Attorney, Agent, or Firm—Wilkinson, Mawhinney & Theibault

[57] ABSTRACT

A pipe part comprising an abutment-edge and a retaining ring being interconnected by means of retaining strips or dumb-bells which dumb-bells or strips will yield under a load without breaking. The pipe part consists of a polyolefin, preferably a polypropylene.

5 Claims, 3 Drawing Figures

PIPE PART WITH A DISPLACEABLE ABUTMENT EDGE

BACKGROUND OF THE INVENTION

The invention relates to a pipe part comprising an abutment edge being displaceable when a certain load is exceeded.

A pipe part of this type is known per se and is employed, for instance, when connecting a main sewer with a branch pipe part.

Said known construction presents the disadvantage that the abutment edge is broken off when the branch pipe part is subjected to too high a load, thus causing the male pipe part to penetrate farther into the female pipe part. For that purpose the abutment edge is connected with the corresponding pipe part through a part having a wall weakening.

Pipe parts of this type also offer the disadvantage that the manufacture of an abutment edge comprising a displaceable abutment-edge part is very expensive, as complicated mould constructions are required to that aim.

After the abutment-edge part has broken off the male pipe part cannot possibly be held any longer when loads are exerted later on, thus causing the said male part to be pushed too far, which may give rise to a cleavage or a leakage in the branch section.

Similar disadvantages occur when employing the said constructions in a movable shaft part of a gulley.

SUMMARY OF THE INVENTION

The present invention aims to alleviate the above-mentioned disadvantages in that the abutment edge is fixed by means of an abutment-edge-retaining-member being extendable, but not breaking off when a certain load is exceeded.

Not breaking off means that extension of the retaining member will not involve breaking unless the limits of elasticity are exceeded.

By employing an abutment-edge being fixed by at least an abutment-edge-retaining-member which is extensible but not breaking off when a certain load is exceeded, it is achieved that the said abutment-edge is capable of undergoing a certain displacement, but that the same will not break off, so that the abutment edge can retain its supporting function after the displacement of the abutment-edge.

This is very appropriate since the male pipe part is constantly supported, even after a displacement of the abutment-edge so that any undesired damages of pipe parts or any undesired leakages are avoided. The manufacture of the said construction is furthermore much cheaper.

Advantageously the abutment edge is connected with a ring fixed upon the inner wall of the pipe part, via at least one strip-shaped and preferably a dumb-bell-like-shaped retaining member. Said retaining member is capable of being deformed easier when the limit of elasticity is exceeded, thus enabling the desired displacement of the abutment-edge.

The strip-shaped retaining member is appropriately dumb-bell-like-shaped so that the location where the deformation is going to occur can be fixed; this is the narrowest part of the retaining member.

A very expedient embodiment is in the strip-shaped retaining member having the shape of a drawing bar, preferably (as seen in cross-sectional view) acting both in tangential as in radial direction. Hereby a very easy displacement of the abutment-edge is also achieved.

The abutment edge in accordance with the invention is preferably displaceable with a velocity of 5 cm/min at a load of 8 N/mm2. A possible maximum displacement of 8 cm is generally sufficient.

The abutment-edge expediently consists of a thermoplastic, preferably of polyolefins, particularly of polypropylenes. However, polyethylene, having a density of 9.35 is also very suitable.

The invention in another aspect relates to a tubular assembly, comprising an abutment-edge, a retaining ring and at least a retaining member being fixed between the abutment-edge and the retaining ring, which assembly is suitable for use in a pipe part according to the invention.

Such a tubular assembly offers the advantage that the displaceable abutment-edge in accordance with the invention can be used in each pipe part, by means of a separate element.

Consequently the pipe parts can be manufactured in any desired shape.

DESCRIPTION OF PREFERRED EMBODIMENTS

Figure 1:
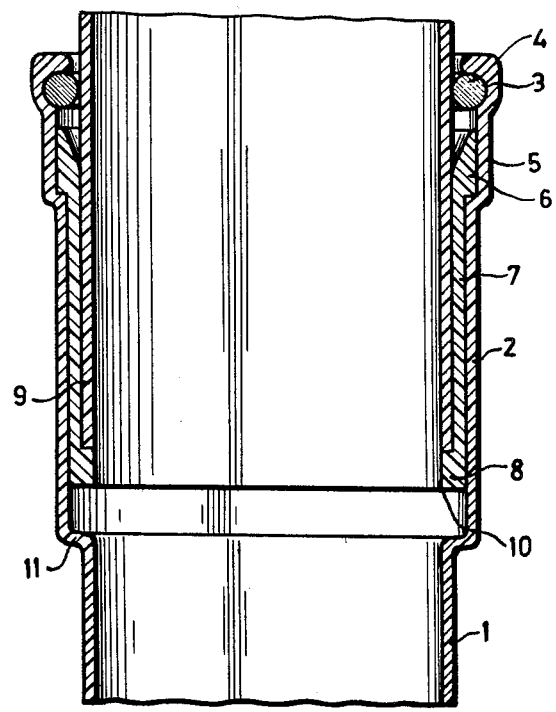
FIG. 1 is a longitudinal cross section through a pipe part in accordance with the invention.

FIG. 1 shows a pipe part 1, comprising a socket 2. The socket comprises an annular chamber 3 accomodating a sealing sleeve 4. In a second annular widening or upon a support edge 5 there is a retaining ring 6 being connected with an abutment-edge 8 through strip-shaped-abutment-edge-retaining members 7.

Normally, when a male pipe part 9 is positioned against the abutment-edge 8, the abutment-edge 8 will support the male pipe part 9.

As soon as the abutment-edge 8 is subjected to a load of more than 8 N/mm2, the strip-shaped members 7 will show a yield effect, particularly in the centers of the strip-shaped members 7. Owing thereto the abutment edge is capable of being displaced downwardly, however, without a breaking of the strip-shaped members 7.

As can be seen, the abutment edge will be subjected to a downward movement being restricted by the lowermost edge 10 of the abutment edge 8 and a ridge 11 of the socket-shaped widening 2, said ridge 11 forming the transition between the pipe part 1 and the socket end or the widened part 2.

Figure 2:
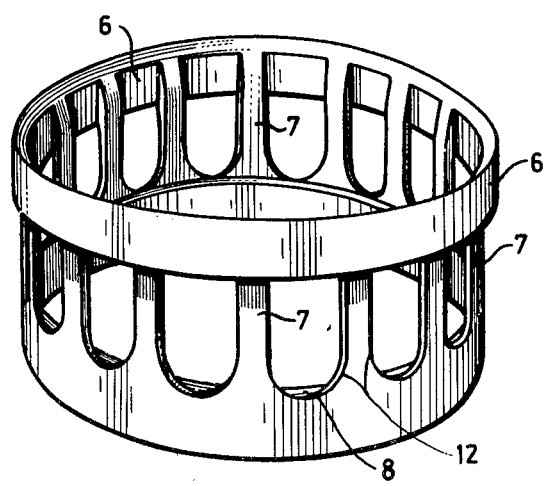
FIG. 2 is a tubular assembly, particularly suitable for a pipe part in accordance with the invention.

FIG. 2 represents a slightly different embodiment of the assembly with abutment edge as shown in FIG. 1.

Figure 3:
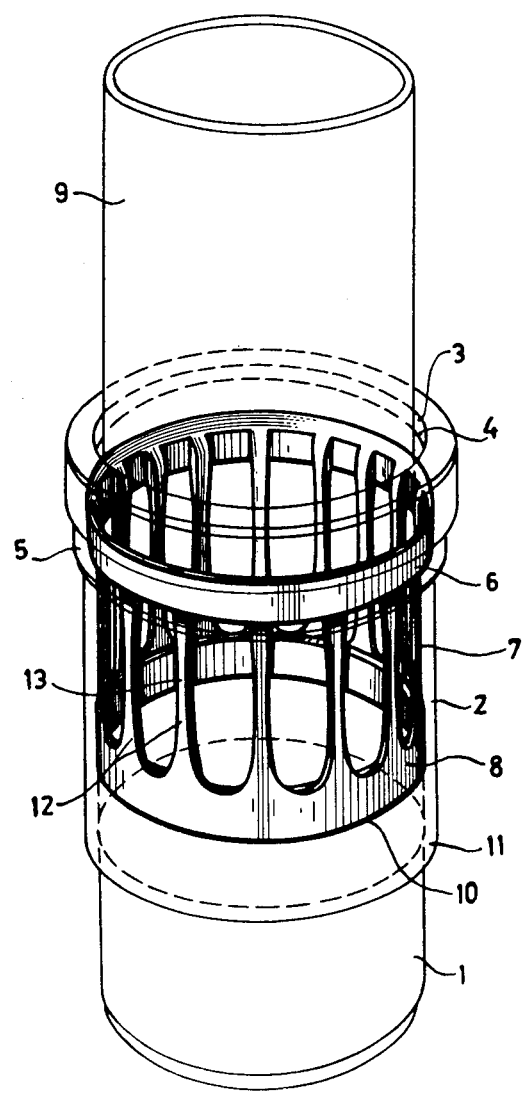
FIG. 3 is another embodiment of a pipe part in accordance with the invention.

According to FIG. 3 the abutment-edge 8 is connected with the retaining edge 6 by means of strips having the shape of dumb-bell-like drawing bars 12, eventually presenting a narrow part 13. Said bars being drawing bars which can be drawn toward radial and tangential directions.

The drawing bars 12 between the abutment edge 8 and the retaining edge 6 allow a relative movement of the abutment edge 8 by a deformation of the drawing bars 12 in two directions, the deformation is facilitated by the narrower parts 13 of the drawing bars 12.

It has been found that the latter embodiment offers great advantages in comparison with plastic pipe parts which have been used up till now.

Especially the manufacture of the said pipe parts with a displaceable abutment edge is much cheaper as the said displaceable abutment edge can be applied in the pipe parts much easier.

The abutment edge with strip-shaped parts or dumb-bell-shaped parts and retaining edge may expediently consist of polyethylene having a density comprised between 0.920 and 0.960, more particularly comprised between 0.930 and 0.940. In the case of polyethylene a quality having a medium density of 0.937 is used.

A polypropylene having a density of 0.905 and a melt-flow index comprised between 0.6 and 0.9 is very preferred.

It appears that at a pressure of 10 N/mm2, a male pipe part of polypropylene can be displaced across a distance of 8.0 cm with a displacement velocity of 5 cm/min without causing any break in the strip- or dumb-bell-shaped parts 7. Said dumb-bell-shaped parts 7 will only get constricted.

Though it is preferred that the strip or dumb-bell-shaped parts extend parallel with the center line, it will be clear that this is not essential to the present invention.

What is claimed is:

1. A pipe insert part of thermoplastics for connection of telescopically inserted pipes (9 and 12), said insert being provided with annular means (ring 6) for axially supporting said insert upon pipe 2 and an annular abutment edge for engaging the front side of an inserted pipe (9), said insert being capable of withstanding a maximum axial force executed by axial loads executed upon inserted pipe 9 without breaking, said means (ring 6) and abutment edge 8 being connected by connecting part means (7), which are strip shaped or bar shaped and are circumferentially spaced from each other with the area between adjacent connecting part means being open to the radial interior and exterior of said insert, said connecting part means 7 are formed of a polyolefin, said connecting part means 7 being capable of allowing elongation without breaking when they elongate over a height corresponding with the height between the lower side of the abutment edge (8) and a shoulder (11) between pipe 9 and pipe 1.

2. The pipe part of claim 1, wherein the abutment edge and connecting part means consists of a thermoplastic, preferably a polyolefin.

3. The pipe part of claim 1, wherein the abutment edge consists of a polyethylene having a density of 0.920 to 0.960.

4. A pipe part as defined in claim 1, wherein the abutment edge consists of a polyethylene having a density of 0.930 to 0.940.

5. A pipe part as defined in claim 1, wherein the abutment edge consists of polypropylene.

* * * * *